July 6, 1948.  N. HEIMBACH ET AL  2,444,605

STABILIZERS FOR PHOTOGRAPHIC EMULSIONS

Filed Dec. 15, 1945

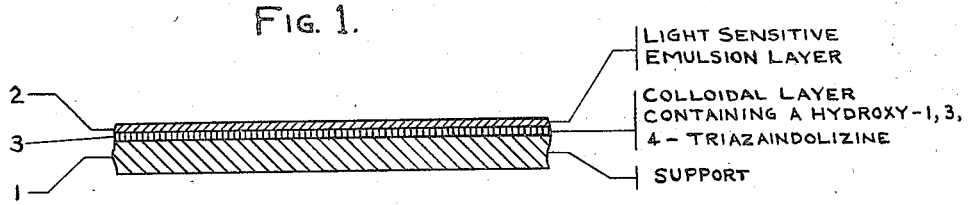

FIG. 1.
- LIGHT SENSITIVE EMULSION LAYER
- COLLOIDAL LAYER CONTAINING A HYDROXY-1,3,4-TRIAZAINDOLIZINE
- SUPPORT

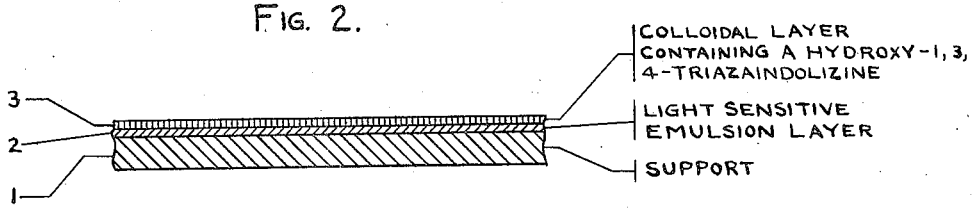

FIG. 2.
- COLLOIDAL LAYER CONTAINING A HYDROXY-1,3,4-TRIAZAINDOLIZINE
- LIGHT SENSITIVE EMULSION LAYER
- SUPPORT

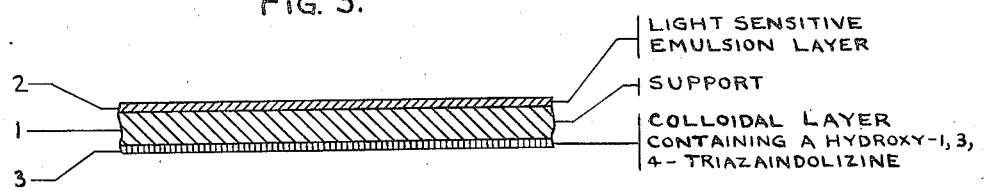

FIG. 3.
- LIGHT SENSITIVE EMULSION LAYER
- SUPPORT
- COLLOIDAL LAYER CONTAINING A HYDROXY-1,3,4-TRIAZAINDOLIZINE

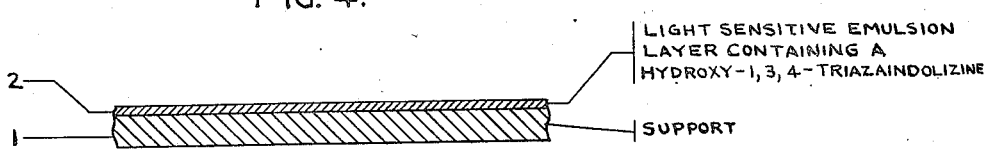

FIG. 4.
- LIGHT SENSITIVE EMULSION LAYER CONTAINING A HYDROXY-1,3,4-TRIAZAINDOLIZINE
- SUPPORT

INVENTORS
NEWTON HEIMBACH
WALTER KELLY JR.
BY
ATTORNEYS

Patented July 6, 1948

2,444,605

UNITED STATES PATENT OFFICE 2,444,605

STABILIZERS FOR PHOTOGRAPHIC EMULSIONS

Newton Heimbach and Walter Kelly, Jr., Binghamton, N. Y., assignors to General Aniline & Film Corporation, New York, N. Y., a corporation of Delaware Application December 15, 1945, Serial No. 635,334

11 Claims. (Cl. 95—7)

This invention relates to the stabilization of light-sensitive silver-halide emulsions, and more particularly to the use of reaction products obtained by a condensation of a β-keto ester, a malonic ester or a mononitrile of a malonic ester, with a 3-amino-1,2,4-triazole as stabilizers for silver-halide emulsions.

It is known in the art that light-sensitive emulsions, such as gelatin silver-halide emulsions, have a decided tendency to fog. The fog may be of two types, namely, yellow fog and chemical (gray) fog. The yellow fog, sometimes referred to as color fog or dichroic fog, is essentially a colloidal deposit of silver, the color intensity and general appearance of which are determined by the minute particle size and degree of subdivision. The fog is chiefly yellow in color and is most apparent in the lighter portions of a negative. The color may vary, however, and the colloidal silver particles may, for example, appear green by reflected light and yellow or red by transmitted light. The so-called chemical fog, or gray fog, on the other hand, is the more common and is formed in a number of ways. It may be caused by premature exposure, by excessive ripening of the emulsions, or by the storage of the film, particularly at high temperatures or for unusually long periods of time.

The primary object of the present invention is to provide stabilizers or fog inhibiting agents which tend to prevent the formation of chemical fog in light-sensitive silver-halide emulsions.

A further object is to provide stabilizers or anti-fogging agents for light-sensitive silver-halide emulsions, which do not lower the sensitivity of the emulsion, and which increase its stability.

Still further objects and advantages will appear from the following specification.

We have found that the above objects are accomplished by the use of reaction products obtained by a condensation of a β-keto ester, a malonic ester, or a mononitrile of a malonic ester with an aminotriazole. The references in Beilstein have advanced the name hydroxy-1,3,4-triazaindolizines for these reaction products which implies a structure of the following general formula:

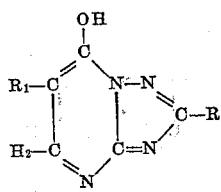

wherein R is hydrogen, alkyl, e. g., methyl, ethyl, propyl, isopropyl, butyl, amyl, and the like, alicyclic, e. g., cyclopentyl, cyclohexyl, and the like, aryl, e. g., phenyl, naphthyl, diphenyl, etc., or a heterocyclic radical, e. g., pyridyl, furyl, pyrryl, pyrazolyl, and the like, $R_1$ is hydrogen or an alkyl, alicyclic, aryl, or heterocyclic radical of the same value as R, and $R_2$ is either amino, hydroxy, carbalkoxy, e. g., carbethoxy, carbpropoxy, and the like, or an alkyl, alicyclic or heterocyclic radical of the same value as R. However, when R and $R_1$ are hydrogen, $R_2$ must be one of the radicals other than alkyl.

The method for the preparation of the hydroxy-1,3,4-triazaindolizines is given in the literature. The method consists of heating 1 mol of a β-keto ester, a malonic ester, or a mononitrile of a malonic ester, with 1 mol of a 3-amino-1,2,4-triazole of the following general formula:

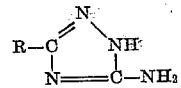

wherein R is hydrogen, alkyl, e. g., methyl, ethyl, propyl, and the like, or an aryl radical, e. g., phenyl, naphthyl, diphenyl, and the like.

Suitable β-keto esters are, for example, acetoacetic ester, benzoylacetic ester, α-ethyl-acetoacetic ester, α-phenylacetoacetic ester, ethyl nicotinoacetic ester, γ-cyclohexanoacetic ester, and the like.

As examples of suitable malonic esters and mononitriles thereof, according to this invention may be mentioned, dimethyl malonate, diethyl malonate, diethyl methylmalonate, diethyl ethylmalonate, methyl cyanoacetate, ethyl cyanoacetate, ethyl α-methyl-cyanoacetate, and the like.

As suitable 3-amino-1,2,4-triazoles may be mentioned, 3-amino-5-methyl-1,2,4-triazole, 3-amino-5-phenyl-1,2,4-triazole, and the like.

The condensation between the β-keto ester, a malonic ester, or a mononitrile of a malonic ester, and the 3-amino-1,2,4-triazole, is carried out by heating the reaction components at a temperature ranging from 70° C. to 120° C., preferably at reflux temperature in the presence of a suitable solvent, such as glacial acetic acid, pyridine, or alcoholic alkali, for a period of three to eight hours. During this treatment, water and alcohol are formed. As the condensation or ring closure between the reactants proceeds, the final product either precipitates from solution during the course of the reaction or is removed by diluting the solvent with water, ethyl ether, acetone, or the like. The reaction is described more fully for compound 1 in Berichte 42, page 4643, and for compounds 2, 4, and 8 in Berichte 43, pages 378–380. The same conditions herein described were applied in the preparation of compounds 3 to 7 and 11 to 18, inclusive. The method for the preparation of the products of the type illustrated by compound 9 consists of heating one mol of a malonic ester with 1 mol of a 3-amino-1,2,4-triazole, under the same reaction conditions as given in the above references. The method for the preparation of the products of the type illustrated by compound 10 consists of heating 1 mol of a mononitrile of a malonic ester with 1 mol of a 3-amino-1,2,4-triazole.

The 3-amino-1,2,4-triazoles, β-keto esters, malonic esters and mononitriles thereof, are well-known to the art, and the methods for their preparation need not be described herein.

Specific compounds which have been prepared according to the above procedure with their probable formulae are the following:

(1)
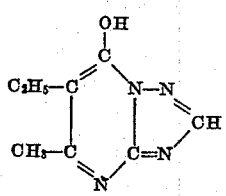
7-hydroxy-6-ethyl-5-methyl-1,3,4-triazaindolizine (2)
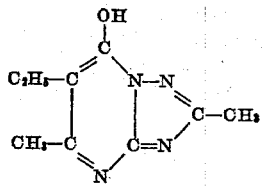
7-hydroxy-6-ethyl-2,5-dimethyl-1,3,4-triazaindolizine (3)
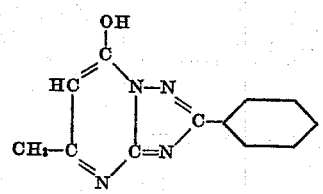
7-hydroxy-5-methyl-2-phenyl-1,3,4-triazaindolizine (4)
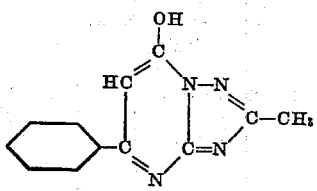
7-hydroxy-2-methyl-5-phenyl-1,3,4-triazaindolizine (5)
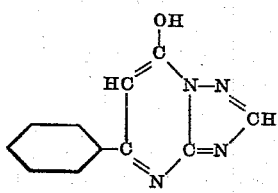
7-hydroxy-5-phenyl-1,3,4-triazaindolizine (6)
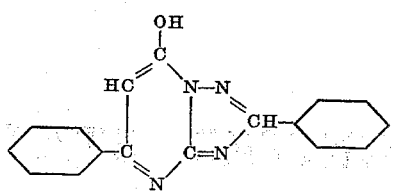
7-hydroxy-2,5-diphenyl-1,3,4-triazaindolizine (7)
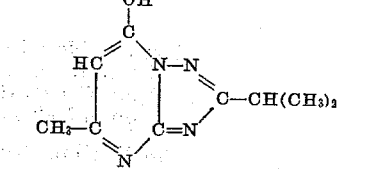
7-hydroxy-2-isopropyl-5-methyl-1,3,4-triazaindolizine (8)
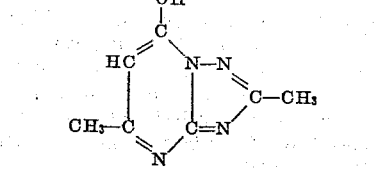
7-hydroxy-2,5-dimethyl-1,3,4-triazaindolizine (9)
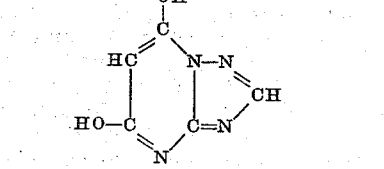
5,7-dihydroxy-1,3,4-triazaindolizine

(10)
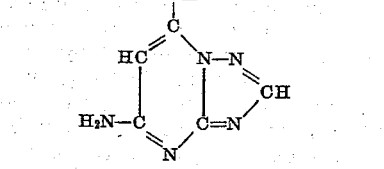
7-hydroxy-5-amino-1,3,4-triazaindolizine

(11)
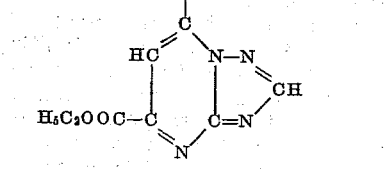
7-hydroxy-5-carbethoxy-1,3,4-triazaindolizine

(12)
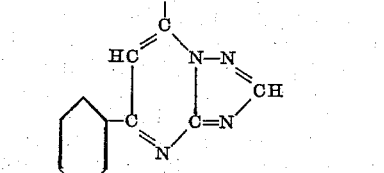
7-hydroxy-5-[β-pyridyl]-1,3,4-triazaindolizine

(13)
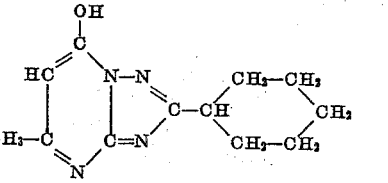
7-hydroxy-2-cyclohexyl-5-methyl-1,3,4-triazaindolizine

(14)
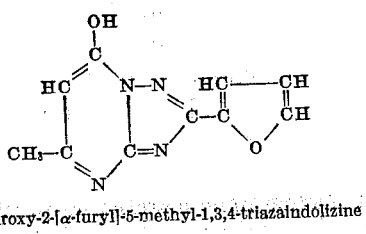
7-hydroxy-2-[α-furyl]-5-methyl-1,3,4-triazaindolizine

(15)
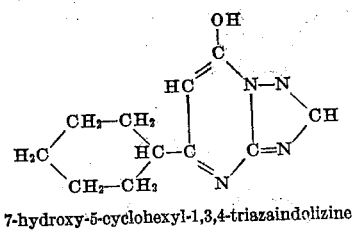
7-hydroxy-5-cyclohexyl-1,3,4-triazaindolizine

(16)
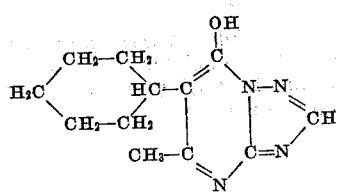
7-hydroxy-6-cyclohexyl-5-methyl-1,3,4-triazaindolizine

(17)
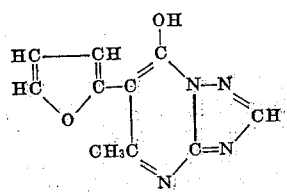
7-hydroxy-6-α-furyl-5-methyl-1,3,4-triazaindolizine

(18)
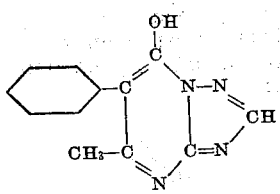
7-hydroxy-5-methyl-6-phenyl-1,3,4-triazaindolizine

In the preparation of an emulsion containing the stabilizers used according to our invention, a solution of the stabilizer in a suitable solvent, such as alcohol or an alcohol-water mixture, adjusted to a neutral or slightly alkaline pH, i. e., pH 7.5 to 10, is made up and the solution mixed with the emulsion at any point during its preparation, but preferably during ripening or just prior to coating in concentrations varying from 25 mg. to 500 mg. per liter of emulsion. The actual concentration employed will depend upon the type of emulsion used and may vary somewhat with the particular compound employed.

The method of testing the stabilizers employed in the following examples consists of coating two film strips, such as cellulose acetate, with the same emulsion, one with and one without any stabilizer, storing the emulsions in an incubator for six days at 50° C., then exposing, developing, fixing, and washing the same under standard conditions. The fog density or blackening produced in the unexposed areas in the two emulsions is then measured in a transmission densitometer of standard type.

The following examples will serve to illustrate certain ways in which the stabilizers of our invention have been applied, but are not to be construed as limiting the invention.

*Example I*

A photographic film coated with an ordinary gelatin-bromoiodide emulsion of normal speed and contrast on development under standard conditions, after incubation for six days at 50° C., gave a fog of 0.28 density. Another film coated with the same emulsion containing an addition of 100 mg. of Compound 12 per 1000 cc. of emulsion equivalent to about 50 grams of silver-halide, and developed under the same conditions, after the same incubation, gave a fog of only 0.08 density.

*Example II*

Example I was repeated with the exception that an equivalent quantity of Compound 5 was substituted for Compound 12. The results obtained were almost identical with those obtained in Example I.

*Example III*

Example I was again repeated with the exception that 75 mg. of Compound 1 were substituted for 100 mg. of Compound 12. After incubation and development, the emulsion containing Compound 1 gave a fog of only 0.1.

Further experiments have shown that emulsions containing stabilizers in accordance with our invention have not only improved keeping qualities (i. e., a reduction in the fog produced by incubation or by long storage) but have greatly diminished and, in some cases completely eliminated changes of speed to which some emulsions are susceptible.

The stabilizers, which we have described and employed, may be used in various kinds of emulsions. In addition to being useful in orthochromatic and panchromatic emulsions, they may also be used in non-sensitized emulsions and X-ray emulsions. If used with sensitizing dyes they may be added to the emulsion before or after the dyes are added. The dispersing agents for the silver-halides may be gelatin or other colloid such as water-soluble cellulose derivatives e. g., hydroxy ethyl cellulose, methyl cellulose, carboxy-oxy-cellulose, low acetyl value cellulose acetate, and the like. The stabilizers may also be employed in gelatin or other colloid, such as polyamides or a mixture of gelatin with a polyamide as described in United States Patent 2,289,775; polyvinyl alcohol and jelling compound as described in United States Patent 2,249,537; polyvinyl acetaldehyde acetal resins and partially hydrolyzed acetate resins described in United States Patents 1,939,422 and 2,036,092; cellulose derivatives, e. g., cellulose nitrate, cellulose acetate, the lower fatty acid esters of cellulose including simple and mixed esters, ethers of cellulose, and the like, as an under or overcoat for the emulsion, or as backing layer for the support. Moreover, they may be incorporated in the support for the sensitive emulsion layer or in an intermediate layer between the sensitive emulsion layer and the support, such as the baryta coating commonly used in photographic papers, or they may be incorporated in a protective layer coated upon the emulsion surface, or the otherwise finished photographic material may be bathed in an alcohol or alcohol-water solution containing the stabilizer.

In the accompanying drawing the various figures are enlarged section views of photographic materials having anti-fogging layers made according to our invention.

As shown in Figure 1, the support 1, which may be of any suitable material such a glass, cellulose ester, synthetic resin, or paper, is provided with an anti-fogging layer 3, containing one of the hydroxy-1,3,4-triazaindolizines referred to above. The light sensitive emulsion layer 2 is attached to the anti-fogging layer 3.

Figure 2 illustrates a similar material in which the support 1 is coated with a light-sensitive emulsion layer 2, and on the latter side there is provided an anti-fogging layer 3 containing one of said hydroxy-1,3,4-triazaindolizines.

Figure 3 illustrates a film or plate of which the support 1 bears on one side the light-sensitive emulsion layer 2, and on the other side an anti-fogging layer 3 containing one of said hydroxy-1,3,4-triazaindolizines.

Figure 4 illustrates a film, plate, or paper of which the support 1 is provided with the light-sensitive emulsion layer 2 containing as an anti-fogging layer one of said hydroxy-1,3,4-triazaindolizines.

Since the presence of these new compounds tends to prevent chemical fog whether they are incorporated directly into the emulsion, added to a separate surface or substratum layer, it is understood that the term "photographic material" as employed herein and in the appended claims, is used in a generic sense to include each of these possible applications.

Various modifications of this invention will occur to persons skilled in the art and it is, therefore, understood that the patent granted shall only be limited by the appended claims.

We claim:

1. A photographic material comprising a base and a light-sensitive silver-halide emulsion carried thereby, said photographic material containing, in fog inhibiting amount, a compound of the general formula:

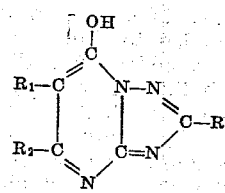

wherein R and R1 are members selected from the class consisting of hydrogen, alkyl, aryl, alicyclic, and heterocyclic groups, and R2 is a member selected from the class consisting of amino, hydroxy, alkyl, alicyclic, aryl, and heterocyclic groups, R2 being a group other than alkyl when R and R1 are hydrogen.

2. A photographic material comprising a base and a light-sensitive silver-halide emulsion carried thereby, said photographic material containing, in fog inhibiting amount, a compound of the following formula:

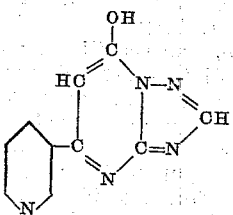

3. A photographic material comprising a base and a light-sensitive silver-halide emulsion carried thereby, said photographic material containing, in fog inhibiting amount, a compound of the following formula:

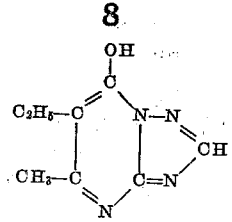

4. A photographic material comprising a base and a light-sensitive silver-halide emulsion carried thereby, said photographic material containing, in fog inhibiting amount, a compound of the following formula:

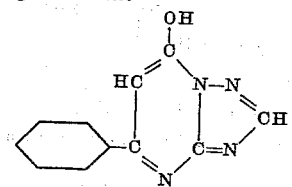

5. A photographic material comprising a base and a light-sensitive silver-halide emulsion containing, in fog inhibiting amount, a compound of the general formula:

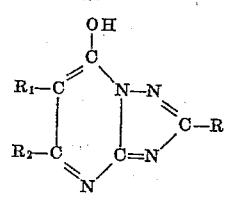

wherein R and R1 are members selected from the class consisting of hydrogen, alkyl, aryl, alicyclic, and heterocyclic groups, and R2 is a member selected from the class consisting of amino, hydroxy, alkyl, alicyclic, aryl, and heterocyclic groups, R2 being a group other than alkyl when R and R1 are hydrogen.

6. A photographic material comprising a light-sensitive silver-halide emulsion containing, in fog inhibiting amount, a compound of the following formula:

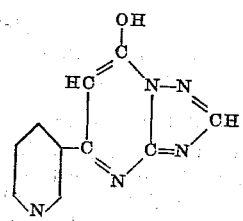

7. A photographic material comprising a light-sensitive silver-halide emulsion containing, in fog inhibiting amount, a compound of the following formula:

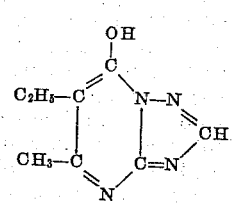

8. A photographic material comprising a light-sensitive silver-halide emulsion containing, in fog inhibiting amount, a compound of the following formula:

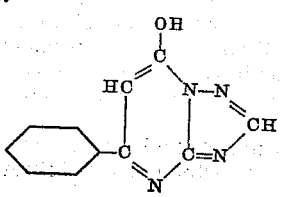

9. A photographic gelatino silver-halide emulsion containing from about 25 mg. to about 500 mg. per liter of emulsion of a compound of the following formula:

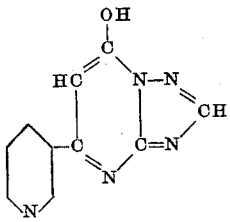

10. A photographic gelatino silver-halide emulsion containing from about 25 mg. to about 500 mg. per liter of emulsion of a compound of the following formula:

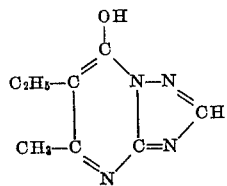

11. A photographic gelatino silver-halide emulsion containing from about 25 mg. to about 500 mg. per liter of emulsion of a compound of the following formula:

NEWTON HEIMBACH.
WALTER KELLY, JR.

REFERENCES CITED

The following references are of record in the file of this patent:

UNITED STATES PATENTS

| Number | Name | Date |
|---|---|---|
| 2,390,707 | Heimbach | Dec. 11, 1945 |